March 7, 1950     H. A. VOGEL ET AL     2,499,430
OBTAINING STEROLS OF HIGH PURITY
Filed July 30, 1947
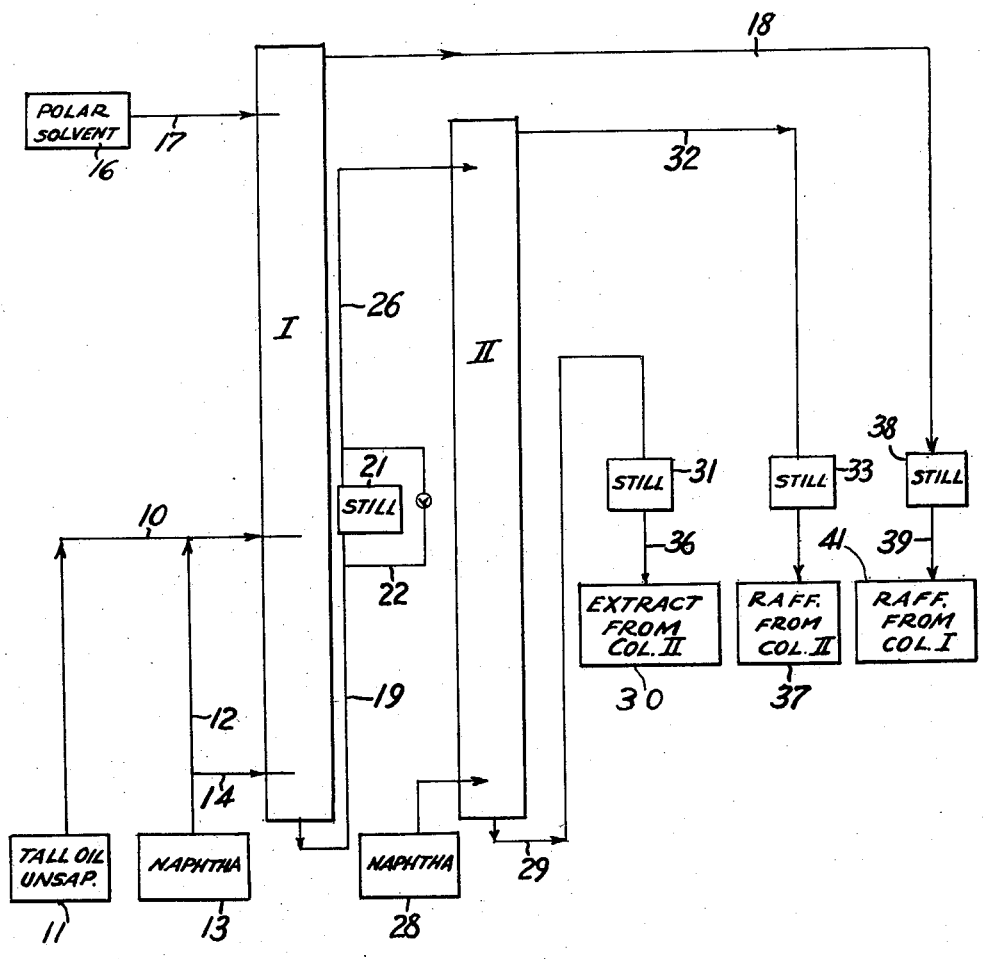
INVENTOR.
HENRY A. VOGEL AND
ROGER M. CHRISTENSON
BY
ATTORNEY Patented Mar. 7, 1950

2,499,430

UNITED STATES PATENT OFFICE 2,499,430

OBTAINING STEROLS OF HIGH PURITY

Henry A. Vogel and Roger M. Christenson, Milwaukee, Wis., assignors to Pittsburgh Plate Glass Company, Allegheny County, Pa., a corporation of Pennsylvania Application July 30, 1947, Serial No. 764,886

24 Claims. (Cl. 260—397.2)

The present invention relates to a process of fractionating and purifying sterol concentrates and it has particular relation to a process of purifying and fractionating a concentrate of unsaponifiable matter as obtained from tall oil by extraction methods.

One object of the invention is to provide a process applicable upon a commercial scale for preparation of relatively pure sterols from tall oil.

A second object is to separate from the unsaponifiable matter of tall oil a fraction of saturated higher alcohols useful for production of synthetic waxes and other purposes.

A third object of the invention is to obtain from the unsaponifiable matter of tall oil a fraction which is rich in polymerized rosin derivatives.

A fourth object is to remove from the unsaponifiable matter of tall oil as obtained by extraction methods certain components which have heretofore prevented the preparation of highly purified sterols by simple methods of crystallization.

A fifth object of the invention is to provide a simple and economical method of obtaining highly purified sterols from the unsaponifiable matter of tall oil.

A sixth object of the invention is to provide a process of separating higher alcohols and other components of the unsaponifiable fraction of tall oil which may be operated continuously and countercurrently.

These and other objects of the invention will be apparent from consideration of the following specification and claims.

It has heretofore been proposed to obtain the unsaponifiable matter of tall oil by a number of different methods. Probably the most satisfactory methods heretofore proposed are disclosed in certain copending applications notably an application to Christenson and Gloyer, S. N. 701,900, filed Oct. 8, 1946, and entitled Separation of unsaponifiable matter from tall oil residues and an application to the same inventors, S. N. 704,314, filed Oct. 19, 1946, and entitled Fractionation of tall oil. The process as disclosed in the first broadly involves saponification of the acids of tall oil such as the higher fatty acids and the rosin acids in a distillation pitch from which a large proportion of the acids have been distilled with an alkali and the extraction of unsaponifiable matter from an aqueous alcoholic solution of the resultant soaps by countercurrent contact of the solutions with a solvent such as petroleum naphtha.

The process of the second application involves dissolving the crude tall oil soaps in aqueous isopropyl alcohol and extracting out the whole unsaponifiable content with naphtha.

By application of such processes, there were obtained in solution in the naphtha, concentrations of unsaponifiable matter comprising sterols such as beta sitosterol, higher alcohols containing 20 to 26 carbon atoms in the hydrocarbon chain, polymerized rosin components and hydrocarbons. There were also present pigmentary materials and perhaps other components of uncertain composition.

In order further to purify this concentrate of unsaponifiable matter, the matter was subsequently dissolved in an appropriate solvent therefor such as alcohol or esters, ethers, hydrocarbons or the like. Upon cooling of the solutions a certain amount of purification resulted owing to selective crystallization of the sterols. However, the composition was such that completely satisfactory crystallization was impossible. Accordingly, it was found impracticable to obtain compositions of greater than 60 to 80 or possibly 85% sitosterol content.

The present invention is based in part upon the discovery that the difficulty of obtaining satisfactory purification of the sterols of the tall oil by crystallization methods was due at least in large measure to the presence of certain alcohols of high molecular weight, e. g. alcohols containing about 20 to 26 carbon atoms in an aliphatic chain. The invention further comprises the discovery that these higher alcohols can successfully be separated from the sterols by washing a naphtha solution of the unsaponifiable matter, for example, with furfural which acts as a selective solvent to remove the sterols together with any polymerized rosin components and certain coloring matters. The furfural solution, having dissolved selectively the sterols, polymerized rosin components and certain of the pigments, may then be in turn washed with naphtha in a second operation. In this operation the naphtha dissolves out the sterols and certain coloring matters, while the furfural selectively retains in solution the highly polymerized components. As an additional feature the resultant concentrate of sitosterol from which the higher alcohols have been removed can successfully be crystallized either with or without the intermediate treatment of rewashing with naphtha in order to obtain products of 90 to 100% sitosterol content.

Various compositions of unsaponifiable matter containing sterols such as sitosterol and higher alcohols may be employed as starting materials for the preparation of relatively pure sitosterol in accordance with the provisions of the present invention. So long as a composition comprising a concentrate of sterols and higher alcohols is obtained as a starting, or raw product for application of the principles of the present invention, it is embraced by the broader concepts as herein described. Especially desirable compositions, however, are obtained by the saponification of tall oil or the distillation residues from the distillation of the fatty acids and rosin acids from tall oil and extraction of the unsaponifiable matter from an alcoholic solution of the resultant soaps with naphtha or other appropriate solvent of unsaponifiable matter of tall oil which solvent is insoluble in the aqueous alcohol solutions. An unsaponifiable composition as obtained by a process such as that disclosed in Christenson and Gloyer application 701,900, filed October 8, 1946, above referred to constitutes a satisfactory material to which the present invention can be applied.

The procedure in the extraction of the concentrate, for example, may comprise the saponification of a distillation pitch or residue from tall oil containing 30 to 40% fatty acids, 27 to 42% rosin acids and 20 to 30% of unsaponifiable components. Such pitches are sold by the West Virginia Paper Pulp Company under the trade name of "Tallene."

In the preparation of a soap solution from which the unsaponifiable matter could be extracted in accordance with the disclosure of the foregoing application 200 parts of distillation pitch, 90 parts of isopropyl alcohol, 24.4 parts of sodium hydroxide and 85.6 parts of water, all expressed as parts by weight were admixed. The mixture was then heated under a reflux condenser to the boiling point until the saponifiable constituents had reacted with sodium hydroxide. Usually one or two hours will be sufficient for the reaction, but heating can be continued longer if so desired. Of course, excessive increase of the period of heating unnecessarily increases the costs.

Soaps of tall oil pitches made as above described may be extracted with naphtha in order to remove the unsaponifiable matter in accordance with the following procedure. The above saponified mixture is diluted with water so that a solution of 15 to 20 parts of the soap in isopropyl alcohol and water is obtained, the isopropyl alcohol being within a range of 15 to 36%. This solution may then be countercurrently extracted with naphtha within a range of 1 to 15 parts by volume per part of soap solution. The extraction may be either batchwise or countercurrent and the temperature of extraction may be within a range of 75–145° F., e. g. 120° F. As a result of this extraction a concentrate of the unsaponifiable matter in the naphtha phase is obtained. This solution may be water washed to remove water soluble impurities.

The naphtha or such other solvent as may be used may be evaporated and if desired, the concentrate may then again be made up with naphtha for treatment in accordance with the provisions of the present invention. However, it is also permissible to employ the naphtha solution as obtained directly from the extraction of the unsaponifiable matter from the soap solutions.

The naphtha may also be evaporated and the concentration of sterols then dissolved in an appropriate solvent such as methyl alcohol or acetone and the solution subjected to cooling to effect crystallization. As a result of this operation a certain degree of concentration of the sterols is obtained by reason of differential crystallization. However, it is impracticable to obtain a concentration of greater than approximately 60 to 85% of sterols (mostly sitosterol) in the crystalline matter. The resultant impure sterol concentrate includes alcohols of long chain length, e. g. 20 to 26 carbon atoms and also polymerized rosin components as well as coloring matter.

It is impracticable further to purify this mixture by direct crystallization methods. However, after the long chain ($C_{20}$ to $C_{26}$) alcohols have been removed by the technique presently to be described, this mixture yields readily to crystallization technique to provide highly purified sitosterol.

In accordance with the provisions of the present invention, it has been found that the long chain length alcohols can readily be removed from the sterol concentrates before or after preliminary crystallization, to obtain a product from which essentially pure sterols can be obtained by crystallization. For purposes of effecting such extraction, the impure unsaponifiable matter constituting the concentrate of sterols is dissolved in naphtha, such as a fraction of petroleum hydrocarbons consisting primarily of open chain saturated compounds boiling preferably within a range of 85 to about 130° C. being preferred. This solution is then extracted with furfural under appropriate condtions.

The extraction may be conducted batchwise or countercurrently but countercurrent extraction is usually preferred since it is more efficient. An appropriate embodiment of apparatus is illustrated diagrammatically in the attached flow sheet indicated in the drawings.

The apparatus as shown includes a colume I to which a solution of tall oil unsaponifiable matter containing 20 to 50% of sterols such as sitosterol, the rest of the mixture being primarily the long chain length alcohols, polymerized rosin components and pigmentary materials in varying proportions may be fed as indicated at 10 from source 11. The feed is continuous or substantially so and the sterols are admixed with naphtha supplied through a line 12 from an appropriate container 13. The feed, preferably, is near or somewhat below the midpoint of the column. If desired, naphtha may also be fed through a branch 14 of the line 12 into a zone near the bottom of the column I. The furfural is fed into the top of the column or near the top of the column from a container 16 through a line indicated at 17.

The unsaponifiable matter and the naphtha may be made up into solution prior to introduction into the feed line 10, or the method indicated in the drawing may be employed in which the unsaponifiable matter is melted to form a flowable body. Along with naphtha, it is fed into the line just prior to introduction into the extraction column I.

The naphthas employed as solvents for the unsaponifiable matter of tall oil may comprise the VMP type containing aromatic hydrocarbons and being of various volatility ranges, or they may be of the straight chain hydrocarbon type. The naphtha preferably should not be of too high volatility since highly volatile materials would entail excessive losses by evaporation and perhaps would even require pressure containers to prevent such loss. Excessively low volatility is also undesirable since it would entail unduly high operating temperatures in the distillation operations. A boiling range of about 85 to 130° C. is to be preferred in most cases.

The furfural preferably is employed in a proportion of 3 to 140 parts by volume per part of unsaponifiable matter to be extracted. The temperature of the column preferably is within the range of about 60 to 160° F. It should be high enough to prevent extensive crystallization of the sterols in the system and yet sufficiently low to prevent excessive mutual solubility of the two solvents in the system. In general, conditions will be so adjusted that 50 to 80% of the unsaponifiable material will pass into the furfural phase from column I.

The use of furfural, water saturated or partially saturated with water at the temperature of operation in the column I, is also contemplated though of course certain adjustments of the solvent ratios and/or the temperatures of operation may be desirable if this change in the mode of operation is employed. In general it will be found desirable to operate with furfural which is essentially water-free.

From the column I is obtained a naphtha phase or fraction which is drawn off at the top of the column as indicated at 18. This fraction includes all or most of the long chain aliphatic alcohols previously referred to and it also includes certain pigmentary materials and perhaps other constituents. This alcohol rich fraction, after evaporation of the solvents may be employed in forming synthetic waxes or for other purposes.

There is also obtained from line 19 passing from the bottom of the column a furfural phase in which is dissolved all or most of the sterols such as sitosterol together with coloring matter and polymerized rosin derivatives of various kinds.

It will be appreciated that the sitosterol from the furfural phase may be employed as such in the preparation of various pharmeceuticals, though perhaps the products obtained by such process would be rather dark in color. In most instances, it is desirable to decolorize and also to remove the polymerized rosin components from the sterols. This may be readily accomplished by crystallization methods, for example by evaporating the furfural from the solid constituents then dissolving the solid material in an appropriate solvent such as acetone or an alcohol or ether or any of the common solvents of sitosterol and the like sterols and then chilling the resultant solution selectively to crystallize out the sterols. The resultant product is still rather dark in color by reason of the presence of small amounts of pigmentary materials.

Usually it is desirable to remove the rosins or polymers of rosins and the coloring matter from the sterol product which has been freed of higher alcohols by appropriate extraction with naphtha. To this end, the line 19 is connected to a still 21 in which a proportion of the furfural, e. g. ½ to ¾ is evaporated. If desired, this still may be by-passed by a line 22 having a valve 24. The solution is discharged into the top of the second column (II) through line 26. Naphtha is introduced into the bottom portion of the column as indicated at 27 from an appropriate storage container 28. The naphtha may be of the same grade as that employed in column I or if desired, it may be of a different grade. Preferably, it is employed within a range of 6 to 150 parts by volume of the unsaponifiable material introduced into the first column. Even higher proportions of naphtha in column II are permissible but of course their use enlarges the size of the apparatus required to handle a given amount of product and otherwise tends to become uneconomical. The temperature of operation of the second column in general, will be within an approximate range of 60 to 160° F.

The furfural solution of polymerized rosins and coloring matter is drawn off through a line 29 at or near the bottom of the column II and may be subjected to distillation in still 31 in order to remove the furfural. The furfural may be recycled for use in column I. The product passes to receiver 30.

The naphtha solution of sterols, such as sitosterol, in a form highly suitable for further purification by crystallization methods may be drawn off at the top of the column through line 32 and passed to a still 33 in which the naphtha is evaporated for re-use or for other purposes. The sterol fraction is drawn off from the still and passes to receiver 37 in which it can be stored or subjected to purification by crystallization methods as herein described.

The naphtha solution of higher alcohols drawn off from column I through line 18 is also passed through a still indicated at 38 in which the solvents are evaporated to obtain said alcohols. These alcohols are passed through line 39 to a receiver 41 for storage or for further treatment.

The crystallization of the sterol fraction as obtained from the treatments previously described are essentially the same as have heretofore been suggested as being appropriate for partial purification of sterols such as sitosterol. The processes involve dissolving the sterols in any one of a large number of organic solvents such as alcohol, acetone, ether and others followed by chilling in order to crystallize out the sterols. The present process, however, distinguishes over those heretofore employed by reason of the fact that it is capable of producing highly pure sterols, e. g. those having melting points up to 139° C. and of a sterol content practically 100% pure. In contradistinction, in the conventional methods of operation the production of pure sterols from tall oil unsaponifiable matter by crystallization methods was difficult if not impossible because the higher alcohols and perhaps other constituents tended to crystallize simultaneously with the sterols thus preventing successful purification.

The treatment of concentrates of unsaponifiable matter as obtained by extraction of said matter from soap solutions of the distillation residues of tall oil have been particularly described. It will also be appreciated that whole tall oil appropriately saponified as above described, can be extracted with naphtha to remove unsaponifiable constituents. This naphtha extract may then be extracted with furfural to remove sterols, the sterol fraction being re-extracted with naphtha and otherwise treated to recover pure sterols as described for preparation of pure sterols from distillation residues.

The general principles of application of the invention has been described. The following illustrates a specific example of the application of such principles:

*Example*

A solution of tall oil unsaponifiable matter in a low-boiling type of naphtha of boiling range 85° to 130° C. containing 40% by weight of unsaponifiable matter was pumped into a 3-inch diameter packed column of 45 ft. height somewhere near its midpoint. Furfural, dry and naphtha-saturated, was pumped in near the top of this column and fresh naphtha near the bottom of the same column. The furfural phase, commonly called the extract, was delivered to a second column, entering it near the top. Into this second column fresh naphtha was pumped near the bottom. The naphtha phase leaving at the top of this column was led through a solvent recovery system and a hard light-brown solvent-free material was obtained in approximately 60% yield (basis the weight of unsaponifiable matter used). The material upon crystallization yielded pure white sterol crystals of 136–138° C. (corr.) melting point, with a purity of better than 95% sitosterol by digitonin assay. The original unsaponifiable matter when crystallized in a similar manner yields sterols of yellowish-brown color (dependent upon the efficiency of washing the crystals) and a sterol purity of 65–80%.

The conditions used in the example cited were as follows:

|  | Vols. | Ratio solvent by vol. to unsaponifiable matter |
| --- | --- | --- |
| COLUMN I: OPERATING TEMPERATURE 130° F. | | |
| Unsaponifiable matter—16 | 48 | 1.0 |
| Naphtha—32 | | 2.0 |
| Furfural | 200 | 12.5 |
| Naphtha as reflux | 40 | 2.5 |
| COLUMN II: OPERATING TEMPERATURE 130° F. | | |
| All furfural phase from Col. I | 225 | |
| Naphtha | 225 | 14.0 |

Yields

A. Expressed in per cent by wt. of solids showing division of unsaponifiable matter in each column:

Per cent

Column I:
    Raffinate—naphtha phase_____ 25.4
    Extract—furfural phase_____ 74.6
Column II:
    Raffinate—Naphtha phase_____ 83.2
    Extract—furfural phase_____ 16.8

B. Net yields—showing the division into final three fractions:

Per cent
Raffinate, Col. I_____ 25.4
Raffinate, Col. II_____ 62.1
Extract, Col. II_____ 12.5
                                             100.0

The solvents were evaporated from the three fractions. The raffinate fraction comprising mainly sterols (e. g. sitosterol) coloring matter and little or no higher alcohols, can be dissolved in a solvent of the sitosterol at a temperature below the melting point of the sitosterol, e. g. at room temperature or somewhat above, and cooled to crystallize out substantially pure sitosterol. Methanol is a good solvent. 750 gms. of crude raffinate product per 12 liters of solvent operates satisfactorily. Other solvents and other proportions can be employed.

|  | Raff. Col. II | Orig. Unsaponifiable matter |
| --- | --- | --- |
| Crystal yield_____per cent__ | 52.8 | 48.0 |
| Net crystal yield (base original Unsap. matter)_____per cent__ | 32.8 | 48.0 |
| Melting point, sterol crystals_____°C__ | 135–136.5 | 115–120 |
| Sitosterol content of crystals, digitonin assay_____per cent__ | Above 95 | 72 |

In the counter-current operation of this system, the yields of material retained in the naphtha phase and in the furfural phase in each column are a function of temperature, concentration of unsaponifiable material present and ratio of naphtha to furfural. By far the most important factor controlling the distribution of the unsaponifiable matter between the two solvents in either column is the naphtha-furfural ratio. For example, in the preferred operation for maximum efficiency and maximum pure sitosterol recovery, the ratio of naphtha to furfural in the first column is 1:2.75 and the naphtha-furfural ratio in the second column is 1.1:1.0. The ratio of naphtha may be raised in the first column, with the result that not only the alcohols but some of the sterols will be retained by the naphtha. Such sterols are then lost for recovery and appear in the final alcohol fraction. Vice-versa, the furfural ratio may be increased in the first column with the result that all the sterols and some of the alcohols will go into the furfural phase. This would lead to alcohols being present in the final sterol-rich fraction. It is to be understood that the yields may be varied at will, placing as much or as little of the unsaponifiable matter into furfural as desired. The same principle of balancing naphtha-furfural ratios in the second column affects the distribution of sterols and rosin-like polymerized materials. The invention is not to be limited to the use of specific ratios of solvent, but for preferred operations the yields in the first column should be 60–80% extract and 20–40% raffinate. These yields are obtained by having a naphtha-furfural ratio between 1:2 and 1:7. The preferred yields in the second column are 60–90% raffinate and 10–40% extract. These may be obtained by having a naphtha-furfural ratio of between 1:0.5 and 1:2.

The process as described above has illustrated the use of a naphtha solution of tall oil unsaponifiable matter as a means of contacting the unsaponifiable matter with furfural. It is within the scope of this invention, and at times it may be desirable, to introduce the unsaponifiable matter into the system without previously contacting it with naphtha to form a solution. Likewise, it is also permissible to prepare a furfural solution of the unsaponifiable matter and allow this solution to be extracted by a naphtha. The primary essential to secure the type of separation desired is to allow the three main components, the unsaponifiable matter, the selective polar solvent, e. g. furfural, and the nonpolar solvent, e. g. naphtha, to be intimately contacted with each other either in single stage batch equipment, or preferably in multiple stage counter-current equipment such as columns and permitting proper separation of the immiscible phases to take place. The manner of introduction of any one component may vary to fit best operating techniques.

The invention has been described with particularity as it is applied to the preparation of substantially pure sterols from tall oil. However, the preparation of substantially pure sterols from wool, fat, fish oils (body or liver) and other materials containing sterols in admixture with higher alcohols is contemplated.

We claim:

1. In a process of obtaining sterols of 90 to 100% purity from a concentrate of said sterols containing about 20 to 50% thereof in admixture with higher alcohols, which is the same as that obtained by saponifying the rosin acids and fatty acids of tall oil and extracting out the unsaponifiable matter from a water and isopropyl alcohol solution thereof with naphtha, the steps which comprise dissolving said concentrate in naphtha, extracting the naphtha solution with furfural to remove the sterols, then removing the furfural from the extracted material.

2. A process of obtaining sterols of 90 to 100% purity from a concentrate of said sterols containing about 20 to 50% thereof in admixture with higher alcohols which is the same as that obtained by saponifying the rosin acids and fatty acids of tall oil and extracting out the unsaponifiable matter from a water and isopropyl alcohol solution with naphtha, which process comprises dissolving said concentrate in naphtha, extracting the naphtha solution with furfural to remove the sterols, then removing the furfural and crystallizing the sterols from a solvent.

3. In a process of obtaining sterols of 90 to 100% purity from a concentrate containing about 20 to 50% of said sterols in admixture with aliphatic alcohols containing 20 to 26 carbon atoms in the hydrocrabon nucleus, polymerized rosin components and coloring matter which is the same as that obtained by saponifying rosin acids and fatty acids of tall oil and extracting out the unsaponifiable matter from a water and isopropyl alcohol solution with naphtha, the steps which comprise dissolving said concentrate in naphtha, extracting the naphtha solution with furfural to remove said sterols and the polymerized rosin components and to leave the higher alcohols in solution in the naphtha, then separating the resultant phases and re-extracting the furfural phase with naphtha to remove the sterols and to leave in solution in the furfural the polymerized rosin components, then evaporating the naphtha.

4. A process of obtaining sterols of 90 to 100% purity from a concentrate consisting of unsaponifiable matter of tall oil and containing about 20 to 50% of said sterols in admixture with aliphatic alcohols containing 20 to 26 carbon atoms in the hydrocarbon nucleus, polymerized rosin components and coloring matter which process comprises dissolving said concentrate in naphtha, extracting the naphtha solution with furfural to remove said sterols and the polymerized rosin components, and to leave the higher alcohols in solution in the naphtha, then separating the resultant phases and re-extracting the furfural phase with naphtha to remove the sterols and to leave in solution in the furfural the polymerized rosin components, then evaporating the naphtha and crystallizing the sterols from an appropriate solvent.

5. In a process of obtaining sterols of 90 to 100% purity from a concentrate thereof containing from 20 to 50% of said sterols in admixture with aliphatic alcohols containing 20 to 26 carbon atoms in the molecular chain together with polymerized rosin components, said concentrate being the same as that obtained by saponifying the rosin acids and the fatty acids of tall oil with alkali and then extracting out the unsaponifiable matter from a water-isopropyl alcohol solution thereof with naphtha, the steps which comprise countercurrently flowing a solution of said concentrate in naphtha through furfural selectively to dissolve out a higher concentrate of said sterols and to leave in solution the alcohols, then removing the furfural from the solution of sterols.

6. A process of obtaining sterols of 90 to 100% purity from a concentrate consisting of the unsaponifiable matter of tall oil and containing 20 to 50% of said sterols in admixture with aliphatic alcohols of 20 to 26 carbon atom chain length and polymerized rosin components which process comprises countercurrently flowing furfural through a naphtha solution of said unsaponifiable matter to obtain two liquid phases, one comprising naphtha containing the higher alcohols, the other containing furfural containing the sterols and the polymerized rosin components, separating the phases and further washing the furfural phase with naphtha in countercurrent flow to remove the sterols and to leave in solution in the furfural the polymerized rosin components, then evaporating the naphtha from the sterol components and recrystallizing said sterol components from an appropriate solvent.

7. A process of obtaining sterol of substantially 90 to 100% purity from a mixture comprising 20 to 50% of sterol and alcohols of 20 to 26 carbon atom chain length, polymerized rosin, coloring matter and the like, the mixture being the same as that resulting from the saponification with alkali of the rosin acids and fatty acids of tall oil followed by extraction of the unsaponifiable matter from a water-alcohol solution of the mixture with naphtha which process comprises dissolving the mixture in naphtha in a ratio of 1 part of said mixture per 3 to 100 parts by volume of naphtha, then extracting said solution with furfural in a ratio of 3 to 40 parts by volume per part of solution separating the resultant phases and recovering the sterol from the furfural phase.

8. A process of obtaining sterol of a purity of 90 to 100% from a crude mixture comprising 20 to 50% of sterol together with aliphatic alcohols of 20 to 26 carbon atom chain length, polymerized rosin components and coloring matter and consisting of unsaponifiable matter of tall oil, which process comprises dissolving the crude mixture in naphtha in a proportion of one part of crude mixture to 3 to 100 parts of naphtha, then countercurrently extracting the resultant solution with furfural in a proportion of 3 to 40 parts per part of the crude mixture, separating the resultant phases, recovering sterol and the polymerized rosin components from the furfural phase and re-crystallizing the mixture of sterol and polymerized rosin components from an appropriate solvent of sterol.

9. A process of obtaining a sterol of 90 to 100% purity from a crude mixture containing 20 to 50% of sterol, alcohols of 20 to 26 carbon atom chain length polymerized rosin components and coloring matter said mixture being the same as that resulting from the saponification of the rosin acids and the fatty acids of tall oil and subsequently extracting the unsaponifiable matter from a water-isopropyl alcohol solution with naphtha as a solvent, which process comprises dissolving the crude mixture in naphtha in a proportion of one part of the crude mixture to 3 to 100 parts of naphtha, then countercurrently extracting the resultant solution with furfural in a proportion of 3 to 40 parts per part of crude mixture, effecting separation of the furfural and naphtha phase and recovering the sterol from the furfural phase by extraction of furfural phase with naphtha.

10. A process of obtaining sitosterol of 90 to 100% purity from a crude mixture consisting of unsaponifiable matter derived from tall oil containing 20 to 50% of sitosterol, higher alcohols polymerized rosin components and coloring matter, and other constituents which process comprises dissolving the crude mixture in naphtha, the mixture being in a proportion of 1 part by volume to 0.5 to 100 parts by volume of naphtha, this solution being flowed into a vertical column near the midpoint thereof and an additional 0.5 to 100 parts by volume of naphtha per part of unsaponifiable matter being introduced near the bottom of the column, then countercurrently extracting the solution in the column with furfural in a proportion of 3 to 200 parts by volume per part by volume of crude unsaponifiable material, effecting phase separation of the furfural and the naphtha solution, then further extracting the furfural solution by introducing it at the top of a second column and allowing to flow downwardly countercurrently to an upward flow of naphtha, the naphtha being in a proportion of 6 to 150 parts by volume of the original unsaponifiable matter, and removing the solvents from the products.

11. A process as defined in claim 10 in which the first mentioned column is operated at a temperature of 60 to 160° F.

12. A process of obtaining substantially pure sitosterol from a concentrate of unsaponifiable matter comprising it in admixture with long chain alcohols, said concentrate being the same as that resulting from the extraction of unsaponifiable matter of tall oil from a water and isopropyl alcohol solution of tall oil, the acids of which have been saponified with alkali, the steps which comprise counter-currently flowing naphtha and furfural in the presence of said unsaponifiable matter to obtain a furfural phase containing the sitosterol and a naphtha phase containing the long chain alcohols, separating the phases evaporating the furfural from the sitosterol and crystallizing the sitosterol from a solvent thereof.

13. In a process of obtaining sterols of a purity of 90 to 100% from a mixture of said sterols and higher alcohols containing 20 to 50% of sterols and consisting of unsaponifiable matter of tall oil, the steps comprising distributing the mixture in a counter-currently flowing system of naphtha and furfural in which the furfural is in a ratio substantially in excess of the naphtha in order selectively to dissolve out most of the sterols in the furfural phase and most of the alcohols in the naphtha phase separating the phases and extracting the furfural phase with naphtha in a second system in an amount to dissolve out most of the sterols contained therein.

14. In a process of obtaining sterols of a purity of 90 to 100% from a mixture of said sterols and higher alcohols containing 20 to 50% of sterols and consisting of unsaponifiable matter of tall oil, the steps comprising distributing the mixture in a counter-currently flowing system of naphtha and furfural, the ratio of naphtha to furfural being within a range of 1 to 3 and 1 to 7 parts by volume whereby selectively to dissolve out most of the sterols in the furfural phase and to dissolve most of the alcohols in the naphtha phase separating the furfural phase and extracting most of the sterols from the naphtha phase by contacting the solution of sterols and furfural with naphtha in a second system in which the ratio of furfural to naphtha is within the range of 1 to .5 and 1 to 2.

15. A process as defined in claim 14 in which the proportion of unsaponifiable matter to furfural in the first system being within a range of 1 to 3 and 1 to 140 parts by volume and in the second system the proportion of unsaponifiable matter upon the basis of the total unsaponifiable matter extracted being within a range of 1 to 6 and 1 to 150 parts by volume.

16. In a process of obtaining sterols of 90 to 100% purity from a mixture consisting of unsaponifiable matter of tall oil, said unsaponifiable matter comprising the sterols in admixture with higher alcohols the sterols constituting 20 to 50% of the mixture, the steps which comprise distributing the unsaponifiable matter between a counter-currently flowing system of intimately contacting furfural and a nonpolar solvent of the higher fatty alcohols immiscible with the furfural, separating the solvent phases and removing the solvents from the solutions of sterols and higher alcohols so obtained.

17. In a process of obtaining sterols of 90 to 100% purity from a mixture consisting of the unsaponifiable matter of tall oil obtained by preliminary crystallization of the unsaponifiable matter of tall oil comprising sterols in admixture with higher alcohols, the steps which comprise distributing the unsaponifiable matter between a system of intimately contacting but counter-currently flowing furfural and naphtha, whereby to dissolve most of the sterols in the furfural phase and most of the higher alcohols in the naphtha phase separating the sterols from the furfural phase re-dissolving the sterols in a solvent therefore and crystallizing them out in highly purified state.

18. In a process of obtaining sterols of 90 to 100% purity from a mixture consisting of the unsaponifiable matter from tall oil containing sterols and higher alcohols the sterols constituting 20 to 50% of the material, the steps which comprise introducing the unsaponifiable matter into a column near its midpoint, flowing furfural into the column near the top and naphtha into the column near the bottom, drawing off the naphtha phase at the top as a raffinate and the furfural phase near the bottom as an extract containing most of the sterols, then separating the solvents from the resultant phases.

19. In a process of obtaining sterols of 90 to 100% purity from a mixture consisting of the unsaponifiable matter from tall oil comprising said sterols and higher alcohols, the steps which comprise introducing the unsaponifiable matter into a column near its midpoint flowing furfural into the column near the top and naphtha into the column near the bottom, drawing off the naphtha phase at the top as a raffinate and the furfural phase near the bottom as an extract containing most of the sterols, then separating the solvents from the resultant phases then further selectively extracting the sterols from the furfural phase by counter-currently contacting said phase with naphtha in a second column.

20. In a process of obtaining sterols of 90 to 100% purity from a mixture consisting of the unsaponifiable matter from tall oil containing the sterols in admixture with higher alcohols the sterols constituting 20 to 50% of the mixture, the steps which comprise introducing the unsaponifiable matter into a column near its midpoint, flowing furfural into the column near the top and naphtha into the column near the bottom, the unsaponifiable matter being in a proportion of 1 part to 3 to 100 parts of naphtha, drawing off the naphtha phase containing most of the alcohols at the top as a raffinate and the furfural phase near the bottom as an extract, containing most of the sterols, then separating the solvents from the phases.

21. In a process of obtaining sterols of 90 to 100% purity from a mixture consisting of the unsaponifiable matter from tall oil containing 20 to 50% of said sterols admixed with higher alcohols, the steps which comprise introducing the unsaponifiable matter comprising higher alcohols and sterols into a column near its midpoint flowing furfural into the column near the top and naphtha into the column near the bottom, the temperature within the column being maintained within the range of 60 to 160° F. drawing off a solution of higher alcohols and naphtha at the top of the column as a raffinate and a solution of sterols and furfural as an extract at the bottom, then separating the solvents from the resultant phases.

22. In a process of obtaining sterols of 90 to 100% purity from unsaponifiable matter of tall oil comprising said sterols in admixture with higher alcohols the sterols constituting 20 to 50% of the mixture, the unsaponifiable matter being the same as that resulting from the saponification of the rosin acids and the fatty acids of tall oil and subsequently extracting the unsaponifiable matter from a water-isopropyl alcohol solution thereof with naphtha as a solvent of the unsaponifiable matter the steps which comprise introducing the unsaponifiable matter into a column near its midpoint, flowing furfural into the column near the top and naphtha into the column near the bottom, the temperature within the column being maintained within a range of 60 to 160° F. drawing off the naphtha phase containing most of the alcohols at the top as a raffinate and the furfural phase from the column at the bottom as an extract containing most of the sterols, then separating the solvents from the resultant phases and further selectively extracting the sterols from the furfural phase by counter-currently contacting the furfural phase containing the sterols with naphtha in a second column.

23. In a process of obtaining sterols of 90 to 100% purity from the unsaponifiable matter from tall oil comprising 20 to 50% of sterols in admixture with higher alcohols, the steps which comprise mixing material consisting of the unsaponifiable matter of tall oil with naphtha, introducing the unsaponifiable matter containing naphtha into a column near its midpoint, flowing furfural into the column near the top and additional naphtha into the column near the bottom, drawing off the naphtha phase containing the higher alcohols at the top as a raffinate and the furfural phase containing the sterols near the bottom as an extract, then separating the solvents from the resultant phase.

24. In a process of obtaining sterols of 90 to 100% purity from a concentrate consisting of the unsaponifiable matter from tall oil, said unsaponifiable matter comprising 20 to 50% of sterols in admixture with higher alcohols, the steps which comprise introducing the unsaponifiable matter admixed with furfural into a column near its midpoint, flowing additional furfural into the column near the top and naphtha into the column near the bottom, drawing off the naphtha phase at the top as a raffinate containing the higher alcohols and the furfural at the bottom as an extract containing most of the sterols then separating the solvents from the resultant phases.

HENRY A. VOGEL.
ROGER M. CHRISTENSON.

REFERENCES CITED

The following references are of record in the file of this patent:

UNITED STATES PATENTS

| Number | Name | Date |
| --- | --- | --- |
| 2,111,259 | Blengsli | Mar. 15, 1938 |
| 2,240,365 | Dreger | Apr. 29, 1941 |
| 2,363,925 | Adams | Nov. 28, 1944 |